(12) United States Patent
Thelin

(10) Patent No.: US 10,207,329 B2
(45) Date of Patent: Feb. 19, 2019

(54) TOOLHOLDER WITH CLAMP HAVING FLUID FLOW PASSAGES, AND TOOL INCLUDING SUCH A TOOLHOLDER

(71) Applicant: SECO TOOLS AB, Fagersta (SE)

(72) Inventor: Jimmy Thelin, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 59 days.

(21) Appl. No.: 14/783,183

(22) PCT Filed: Apr. 3, 2014

(86) PCT No.: PCT/EP2014/056730
§ 371 (c)(1),
(2) Date: Oct. 8, 2015

(87) PCT Pub. No.: WO2014/166815
PCT Pub. Date: Oct. 16, 2014

(65) Prior Publication Data
US 2016/0067786 A1    Mar. 10, 2016

(30) Foreign Application Priority Data
Apr. 9, 2013 (EP) .................................. 13162905

(51) Int. Cl.
| B23B 27/10 | (2006.01) |
| B23B 27/00 | (2006.01) |
| B23B 27/16 | (2006.01) |

(52) U.S. Cl.
CPC ............ *B23B 27/10* (2013.01); *B23B 27/007* (2013.01); *B23B 27/1677* (2013.01); *B23B 2250/12* (2013.01)

(58) Field of Classification Search
CPC ... B23B 27/10; B23B 2250/12; B23B 27/007; B23B 27/1677; B23C 5/28
See application file for complete search history.

(56) References Cited

U.S. PATENT DOCUMENTS

| 4,600,341 A | 7/1986 | Board |
| 4,848,198 A | 7/1989 | Royal et al. |
| 2007/0283794 A1 | 12/2007 | Giannetti |
| 2011/0311323 A1 | 12/2011 | Hecht |

FOREIGN PATENT DOCUMENTS

| CN | 101460272 A | 6/2009 | |
| DE | 2936869 A1 | 3/1981 | |
| EP | 2239072 A1 | 10/2010 | |
| WO | WO 03055629 A1 * | 7/2003 | ......... B23B 27/1677 |
| WO | 2010096014 A1 | 8/2010 | |

* cited by examiner

*Primary Examiner* — Alan Snyder
(74) *Attorney, Agent, or Firm* — Corinne R. Gorski

(57) ABSTRACT

A tool having a toolholder and a cutting insert disposed in the pocket of the toolholder. The cutting insert includes a hole having a cutting insert clamping surface that is contacted by the clamp clamping surface. The clamp clamping surface and the cutting insert clamping surface are formed, such that as a clamp bottom surface is moved toward a bottom surface of the pocket, when a post is in a post hole and a fastener is in a clamp hole and a toolholder hole, the cutting insert is urged against the bottom surface and a rear wall. A tool holder is also disclosed.

15 Claims, 7 Drawing Sheets

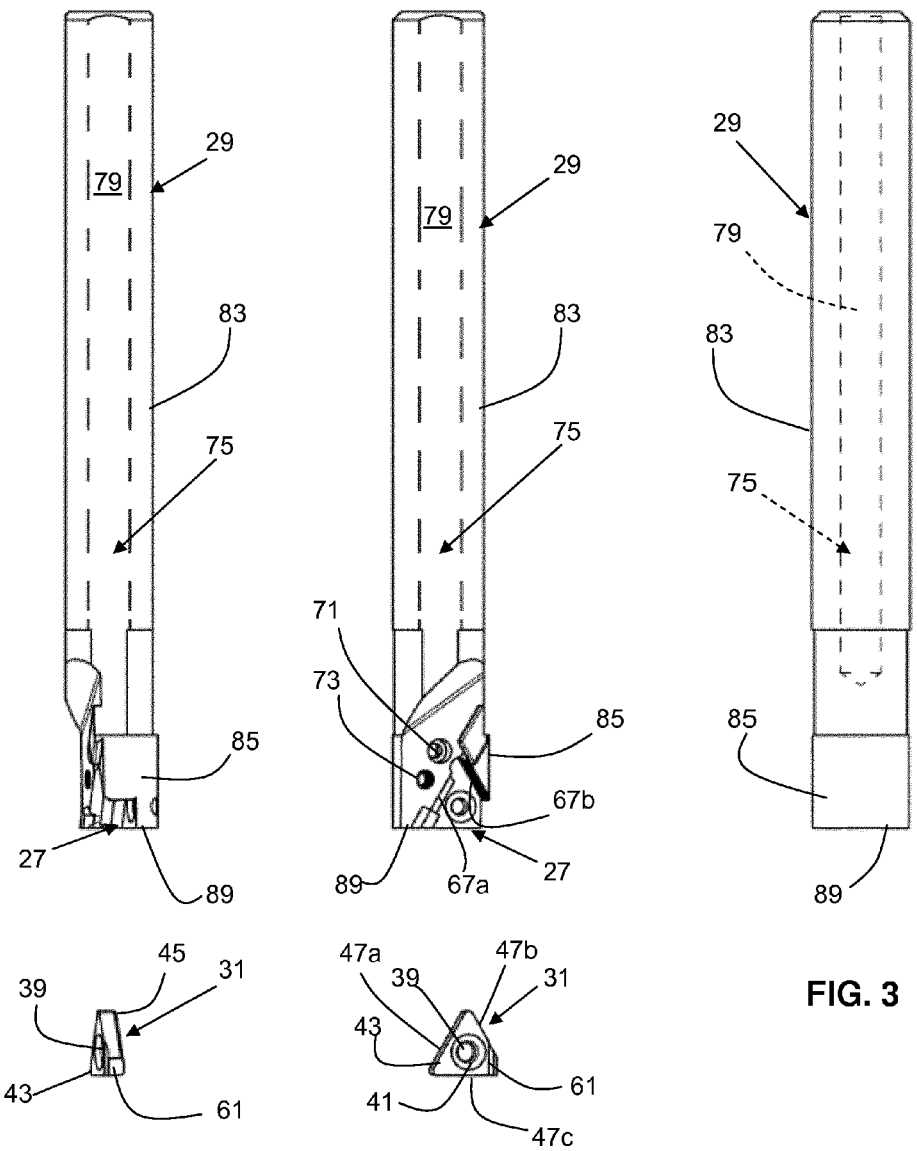

US 10,207,329 B2

TOOLHOLDER WITH CLAMP HAVING FLUID FLOW PASSAGES, AND TOOL INCLUDING SUCH A TOOLHOLDER

RELATED APPLICATION DATA

This application is a § 371 National Stage Application of PCT International Application No. PCT/EP2014/056730 filed Apr. 3, 2014 claiming priority of EP Application No. 13162905.7, filed Apr. 9, 2013.

BACKGROUND AND SUMMARY

The present invention relates generally to cutting tools and, more particularly, to cutting tools with cooling and/or lubricating arrangements.

Machining of metal with cutting tools generates very high heat. To preserve the cutting tool and reduce the risk of damage to the workpiece, it is desirable to provide a cooling or lubricating fluid at the point at which the machining operation occurs. Unfortunately, the space available for providing fluid conduits and other structures needed to introduce the fluid is often limited and may be used by structures necessary to clamp a replaceable cutting insert to a toolholder. Accordingly, it is desirable to provide a tool that facilitates introduction of cooling and/or lubricating fluid to the point at which the machining operation occurs. It is also desirable to provide such a tool that includes structure for securely and accurately positions a replaceable cutting insert relative to the toolholder and ensures that the accurate positioning is retained.

U.S. Pat. No. 4,848,198 describes one solution wherein a pivoting clamp for a replaceable cutting insert is provided with fluid flow conduits that are in flow communication with fluid flow conduits in a shank of the toolholder so that fluid can be introduced at a point above a working cutting edge of the insert. U.S. Patent App. Pub. No. US2011/0311323 describes another solution wherein a pivoting clamping arm has a portion that is received in an opening in a cutting insert and, when the clamping arm is clamped to a toolholder body, the clamping arm is caused to slide rearwardly, drawing the insert against abutment surfaces of a pocket of the toolholder body. However, because of the movement of the clamping arm relative to the toolholder body when clamping, a fluid conduit through the clamping arm leading to an opening near the working cutting edge must be connected to a source of fluid at a top of the clamping arm, which may interfere with certain cutting operations.

According to an aspect of the present invention, a toolholder comprises a clamp for clamping a cutting insert in an insert-receiving pocket of a toolholder body, the clamp comprising a clamp body having a clamp bottom surface, a post extending downwardly from the clamp bottom surface, and a protrusion comprising a clamp clamping surface extending downwardly from the clamp bottom surface, the toolholder body comprising a post hole for receiving the post, and a toolholder hole separate from the post hole, wherein the pocket has a bottom surface at least partially defined by a rear wall and a forward edge, and a fastener that extends through a clamp hole in the clamp body and into the toolholder hole, wherein a clamp fluid flow passage extends through the post and the clamp body to a point above the clamp bottom surface and the clamp clamping surface forms an angle of less than or equal to 70 degrees and greater than or equal to 20 degrees with a longitudinal axis of the post.

According to yet another aspect of the present invention, a tool is provided and comprises the toolholder noted above and a cutting insert disposed in the pocket, the cutting insert having a hole having a cutting insert clamping surface that is contacted by the clamp clamping surface. The clamp clamping surface and the cutting insert clamping surface are formed such that, as the clamp bottom surface is moved toward the bottom surface of the pocket when the post is in the post hole and the fastener is in the clamp hole and the toolholder hole, the cutting insert is urged against the bottom surface and the rear wall.

BRIEF DESCRIPTION OF THE DRAWINGS

The features and advantages of the present invention are well understood by reading the following detailed description in conjunction with the drawings in which like numerals indicate similar elements and in which:

FIGS. 2A and 2B are left side and top views of a toolholder body and cutting insert therefor according to an aspect of the present invention;

FIG. 3 is a bottom view of a toolholder body according to an aspect of the present invention;

DETAILED DESCRIPTION

Figure 1A:
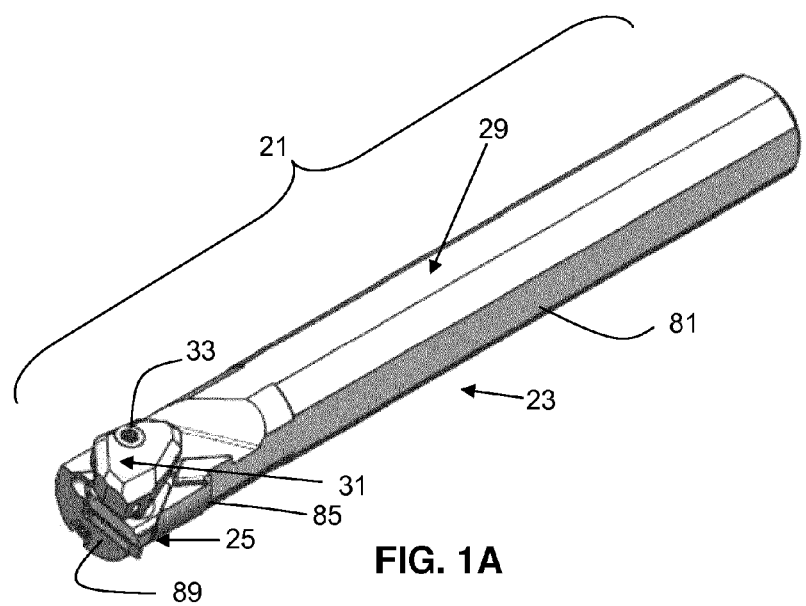
FIG. 1A is a perspective view of a tool according to an aspect of the present invention.
Figure 1B:
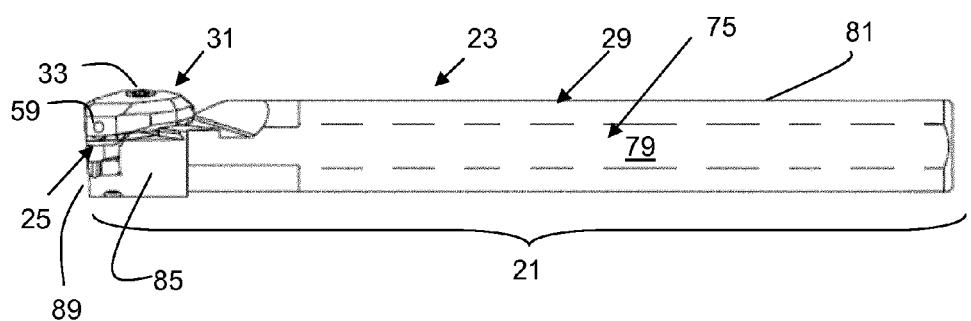
FIGS. 1B and 1C are right side and top views, respectively, of the tool of FIG. 1A.
Figure 1C:
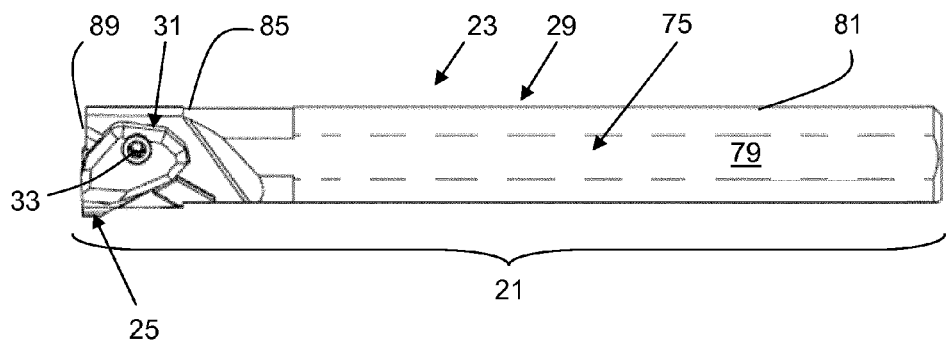

FIGS. 1A-1D show a tool 21 comprising a toolholder 23 and a cutting insert 25 disposed in an insert-receiving pocket 27 (FIGS. 2A-2B, 5A, 5D, and 6) of a toolholder body 29 (FIGS. 1A-3) of the toolholder. The toolholder 23 further comprises a clamp 31 for clamping the insert 25 in the pocket 27 and a fastener 33 that extends through a clamp hole 35 (FIG. 1D) in a clamp body 37 (FIGS. 4A-4E) to fasten the clamp to the toolholder body 29. The particular tool 21 illustrated in FIGS. 1A-1D is intended for use as a threading tool, however, a tool according to the present invention can be used in any cutting application in which a replaceable cutting insert is secured to a toolholder via a clamp. The tool is particularly useful for metal machining, and the cutting insert can be manufactured from any suitable material, such as cemented carbide.

Figure 1D:
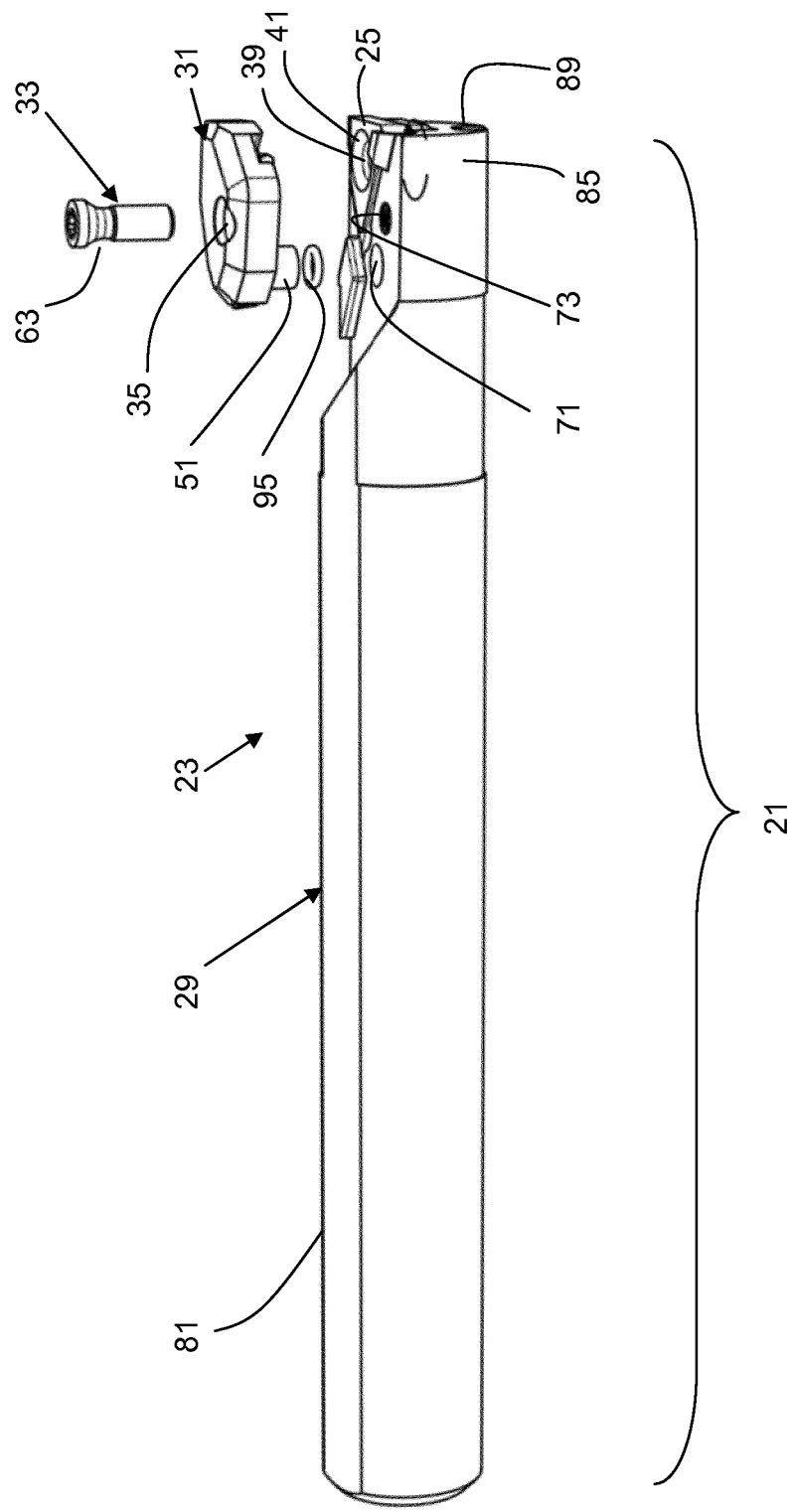
FIG. 1D is an exploded left side view of the tool of FIG. 1A.

As seen in FIGS. 1D and 2A-2B, the cutting insert 25 is of a type having a hole 39 therein, the hole having a cutting insert clamping surface 41 (FIGS. 1D and 2B). The hole 39 is ordinarily but not necessarily centrally located or substantially centrally located on at least a top side 43 (FIGS. 2A-2B) of the insert 25. The hole 39 will ordinarily, but not necessarily, extend through the insert 25 to the bottom side 45 (FIG. 2A) of the insert. In a double-sided insert, a hole 39 may be provided on both the top and bottom sides 43 and 45 or, more typically, will extend through the insert. An insert clamping surface 41 can be provided on both ends of a through hole 39 for a double-sided insert, or on each hole of separate holes 39 on the top and bottom sides 43 and 45 of a double-sided insert. One or more side surfaces 47a, 47b, 47c (FIG. 2B) are provided between the top and bottom surfaces 43 and 45.

The clamp 31 clamps the cutting insert 25 in the pocket 27 of the toolholder body 29 and, as seen with reference to, e.g., FIGS. 4A-4E, comprises the clamp body 37 having a clamp bottom surface 49 (FIGS. 4A and 4C-4E). The clamp 31 includes a post 51 extending downwardly from the clamp bottom surface 49, and a protrusion 53 comprising a clamping surface 55 extending downwardly from the clamp bottom surface. Ordinarily, the clamp bottom surface 49 is substantially flat, and the post 51 is ordinarily substantially perpendicular to the clamp bottom surface and circularly cylindrical.

A clamp fluid flow passage 57 (FIGS. 4B-4D) extends through the post 51 and the clamp body 37 to an opening 59 at a point above the clamp bottom surface 49. The clamp fluid flow passage 57 facilitates directing cooling and/or lubricating fluid to cool a working cutting edge 61 (e.g., FIG. 7B) of the cutting insert 25 as it cuts a workpiece (not shown). The clamping surface 55 forms an angle a (FIG. 4D) of less than or equal to 70 degrees and greater than or equal to 20 degrees, preferably less than or equal to 45 degrees and greater than or equal to 25 degrees, and more preferably less than or equal to 33 degrees and greater than or equal to 30 degrees, with a longitudinal axis of the post 51. The cutting insert clamping surface 41 is ordinarily also formed at an angle to a longitudinal axis of the hole 39 in the cutting insert 25, however, the cutting insert clamping surface may merely be, e.g., an edge of a cylindrical through hole. The clamping surface 55 on the protrusion 53 can be curved to correspond to the shape of the hole 39 or dimple in the cutting insert 25, can be a substantially triangular wedge shape, or can be some other suitable shape. In case the clamping surface on the protrusion is curved axially the angle a at contact area may be defined by a tangent. An imaginary, straight line L (FIG. 4B) may intersect the clamp hole 35, the protrusion 53 and the opening 59 when the clamp 31 is viewed in top view. An imaginary, straight line (not shown) may intersect the post 51, the protrusion 53 and the opening 59 when the clamp 31 is viewed in top view.

The clamp hole 35 of the clamp 31 extends through the clamp body 37, remote from the post 51 and the clamp fluid flow passage 57. As seen in, e.g., FIG. 5A, the toolholder body 29 comprises the pocket 27, the pocket having a bottom surface 65 that is at least partially defined by a rear wall 67 and a forward edge 69, a post hole 71 for receiving the post 51, and a toolholder hole 73 separate from the post hole. Often, a shim 101 as seen in FIGS. 7A and 7B is attached to the toolholder body 29 and a surface of the shim defines the bottom surface 65 of the pocket 27 and, often, the forward edge 69 of the pocket. A shim is not shown in FIGS. 5A, 5D, and 6.

As seen, for example, in FIGS. 1D and 7A, the fastener 33 extends through the clamp hole 35 and into the toolholder hole 73 to fasten the clamp 31 to the toolholder body 29. The fastener 33 is normally distant from the post 51. Ordinarily, the fastener 33 is a bolt or screw with a head 63 having a bottom surface that abuts against a corresponding surface on the clamp, and the toolholder hole 73 is a threaded hole with interior threads that mate with exterior threads on the fastener, however, other fasteners for fastening the clamp 31 to the toolholder body 29 might be used. Whatever form of fastener is used should permit the clamp 31 to be raised relative to the toolholder body 29 sufficiently to permit an insert 25 to be inserted into the pocket 29 under the protrusion 53 extending from the bottom surface 49 of the clamp body 37.

An insert 25 is mounted in the pocket 27 of the toolholder body 29 beneath the clamp bottom surface 49, with the bottom side 45 (FIG. 2A) of the insert in contact with the bottom surface 65 of the pocket, and the protrusion 53 disposed in the hole 39 in the cutting insert. The clamp 31 is positioned relative to the toolholder body 29 so that the post 51 of the clamp is disposed in the post hole 71 of the toolholder body and the fastener 33 extends through the clamp hole 35 and into the toolholder hole 73. When the insert 25 is initially positioned in the pocket 27, the clamp 31 is either not attached to the toolholder body 29 at all (as in FIGS. 1D and 7A) or is fastened loosely enough such that the clamp can be raised so that the insert can be slid underneath the protrusion 53. After the insert 25 is positioned, the clamp 31 is more securely fastened to the toolholder body 29 by the fastener 33.

Because the post 51 is fixed relative to the rest of the clamp body 37, when the post 51 is in the post hole 71, while the clamp 31 may be rotatable relative to the toolholder body 29 if the post and post hole are circular or otherwise shaped to permit rotation, the clamp is otherwise movable relative to the toolholder body substantially only in a direction of the longitudinal axis of the post and the post hole. The clamp clamping surface 55 and the cutting insert clamping surface 41 are formed such that, as the clamp bottom surface 49 is moved toward the bottom surface 65 of the pocket 27 when the post 51 is in the post hole 71 and the fastener 33 is in the clamp hole 35 and the toolholder hole 73 and the fastener is caused to more tightly fasten the clamp 31 to the toolholder body 31, the cutting insert 25 is urged against the bottom surface of the pocket and the rear wall 67 of the pocket. All parts of the clamp may be adapted to move uniformly in the same direction during clamping of the cutting insert 25. In this way, secure mounting and precise positioning of the cutting edge 61 of the insert 25 relative to the toolholder 23 can be achieved without the need to cause the clamp 31 to move relative to the toolholder body 29 other than downward in a direction of the longitudinal axes of the post 51 and the post hole 71. Precise positioning is achieved, for example, by virtue of the precise shape and position of the pocket 27, including the positions of the rear wall 67 and portions 67a and 67b and the bottom surface 65, relative to the rest of the toolholder body 29, which helps to ensure that a precisely dimensioned insert 25 will be properly positioned relative to the toolholder 23, and will be retained in such a position. Ordinarily, but not necessarily, the clamp bottom surface 49 will contact the insert top side 43 to assist the clamping surface 55 on the protrusion 53 to clamp the insert against the bottom surface 65 of the pocket 27. Means such as rotatable cam structures may be provided to facilitate adjustment of the position of the insert 25 relative to the toolholder body 29.

In the embodiment shown in FIGS. 1A-2B and 5A, the pocket 27 has a rear wall 67 (FIGS. 5A and 6) with first and second portions 67a and 67b that contact two corresponding portions of the side surfaces 47a, 47b, and 47c of the insert. FIG. 2B shows the insert 25 arranged so that side surfaces 47a and 47b will contact first and second portions 67a and 67b of the rear wall 67. When the clamp 31 is securely fastened to the toolholder body 29 by the fastener 33, the side surfaces 47a and 47b if the insert are drawn toward the first and second portions 67a and 67b of the rear wall by the relative sliding action of the angled clamp clamping surface 55 and the cutting insert clamping surface 41. In comparison with conventional tools the clamp in the presently claimed toolholder preferably does not pivot about the post and the post hole, since there may be a slip fit between post and post hole. The post may have a g6 shaft tolerance and the post hole a H7 bore tolerance. As the clamp clamping surface 55 is urged downwardly toward the bottom surface 65 of the pocket 27, contact between the clamp clamping surface that is and the cutting insert clamping surface 41 moves upward along the clamp clamping surface toward the clamp bottom surface. The post 51 may be integral with the clamp body 37, to provide good stability thereof.

By appropriate selection of the shapes of the clamp clamping surface 55 and the cutting insert clamping surface 41, the direction in which the cutting insert 25 is moved as the clamp 31 is fastened to the toolholder body 29 can be controlled. Ordinarily, it will be desirable to arrange the clamp clamping surface 55 and the cutting insert clamping surface 41 to develop a force that moves a cutting insert having two side supporting surfaces, such as side surfaces 47a and 47b, so that they are both urged against corresponding abutment surfaces, such as first and second portions 67a and 67b.

Figure 6:
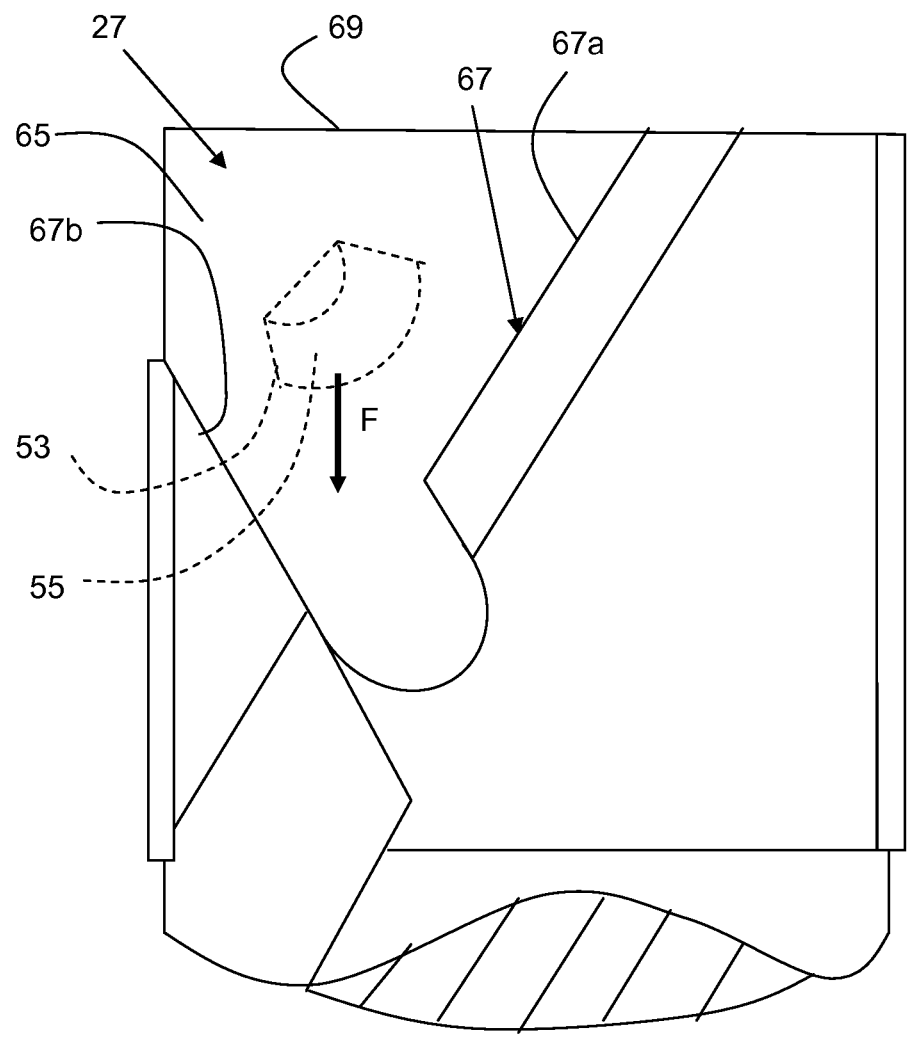
FIG. 6 is a top view of a pocket of a toolholder body according to an aspect of the present invention.
Figure 7A:
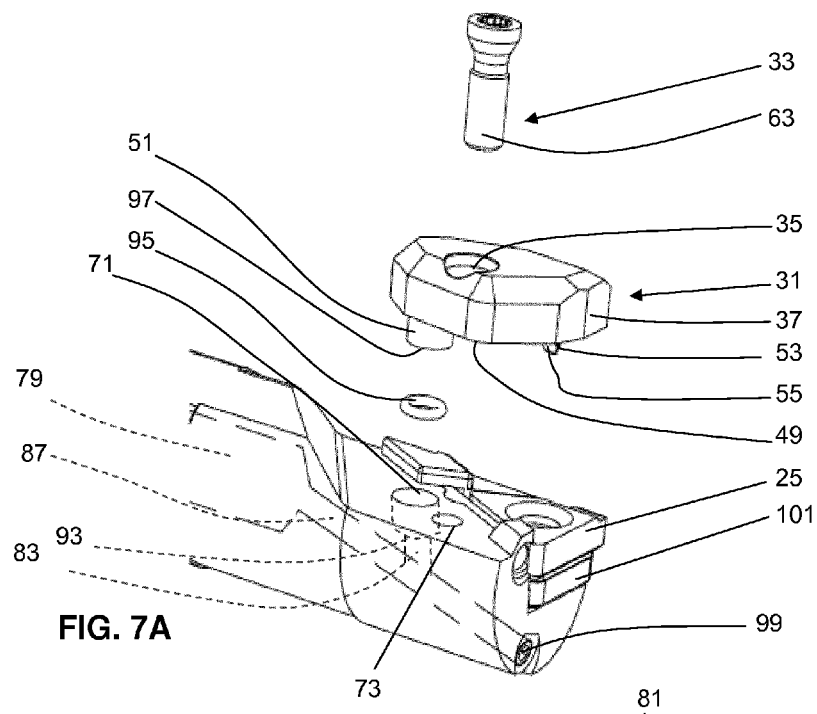
FIGS. 7A and 7B are partially cross-sectional left and right side views of a tool according to an aspect of the present invention.
Figure 7B:
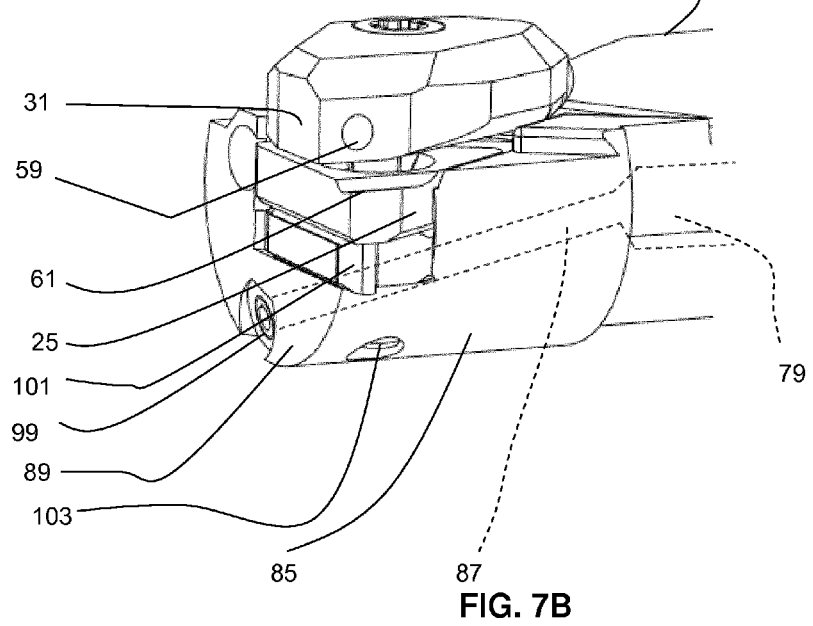

As seen in FIG. 6, which shows the position of the clamp clamping surface 55 (in phantom) in the pocket 27 when the fastener 33 extends through the clamp hole 35 into the toolholder hole 73 and the post 51 is disposed in the post hole 71, the clamp clamping surface, or at least the majority of the clamp clamping surface, is disposed closer to the rear wall 67 of the pocket than to the forward edge 69 of the pocket. In this way, the insert 25 can be securely held in the pocket 27 by a clamp 31 that both urges the cutting insert against the bottom surface 65 of the pocket and against the rear wall 67 of the pocket. Where the insert 25 is to be supported against two abutment surfaces, such as surface portions 67a and 67b, a resultant force F applied by the clamp clamping surface 55 against an insert clamping surface 39 will ordinarily be directed so that a substantial component of the force is directed against each of the surface portions. For example, the resultant force F may be directed toward a corner formed by an extension of each surface portion 67a and 67b as seen in FIG. 6. This can further help to ensure obtaining and retaining accurate positioning of the insert 25 relative to the toolholder 23.

As seen, for example, in FIGS. 1B, 1C, 2A, 2B, 3, 5A-5D, 7A, and 7B, the toolholder body 29 includes a toolholder body fluid flow passage 75 that extends through the toolholder body and is arranged to be in flow communication with the clamp fluid flow passage 57 when the post 51 is in the post hole 71. The toolholder body fluid flow passage 75 and the clamp fluid flow passage 57 together define a toolholder fluid flow passage. The toolholder fluid flow passage facilitates cooling and/or lubricating fluid to be delivered to the working cutting edge 61 without the need to connect complex fluid delivery systems that might interfere with a cutting operation.

Fluid may, for example, be introduced through a generally axially extending first passage portion 79 (shown in phantom in FIGS. 1B, 1C, 2A, 2B, 3, 5A, 7A, and 7B) of a shank portion 81 of the toolholder body 29 toward a generally radially extending second passage portion 83 (FIGS. 5B and 7A) in an end portion 85 in which the pocket is disposed at an end of the shank portion in flow communication with the first passage portion and the post hole 71. As particularly seen in FIGS. 5BA-5D, 7A and 7B, a third passage portion 87 between the first passage portion 79 and the second passage portion 83 can be provided, with the third passage portion extending at a non-zero angle relative to the first and the second passage portions. This structure can facilitate providing the toolholder body fluid flow passage 75 in a manner that avoids an intersection of the toolholder body fluid flow passage with structures such as the toolholder hole 73 or the pocket 25. The third passage portion 87 can be formed by, for example, drilling a hole from an end 89 of the end portion 85 opposite the shank portion 81 toward the first passage portion 79. An end of the third passage portion 87 at the end of the end portion 85 can be plugged, such as by a set screw 99.

The second passage portion 83 will ordinarily extend generally radially relative to the longitudinal axis of the shank portion 81. Similarly, the post hole 71 and the toolholder hole 73 will ordinarily also extend generally radially relative to the longitudinal axis of the shank portion. Preferably, the second passage portion 83, the post hole 71, and the toolholder hole 73 each will extend perpendicularly to a longitudinal axis of the shank portion 81.

Figure 5B:
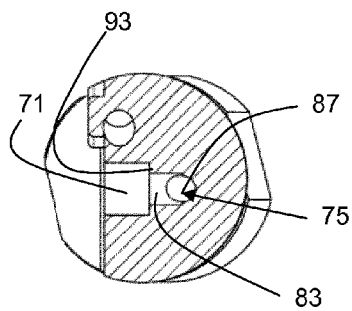
FIGS. 5B, 5C, and 5D are cross-sectional views taken at sections 5B-5B, 5C-5C, and 5D-5D, respectively, of FIG. 5A.
Figure 5C:
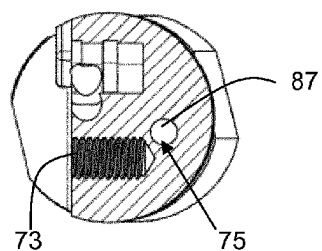
Figure 5A:
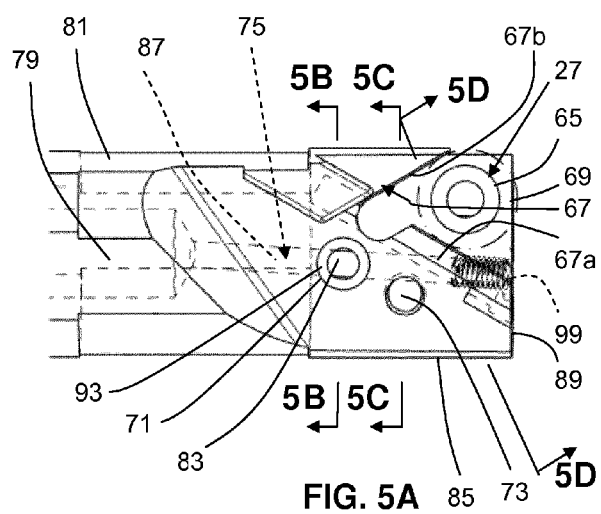
FIG. 5A is a top view of a pocket of a toolholder body according to an aspect of the present invention.
Figure 5D:
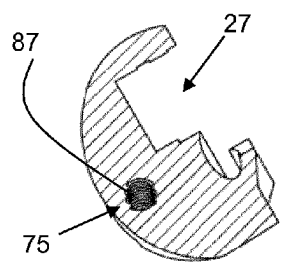

The post hole 71 ordinarily comprises an interior shape substantially the same size and shape as an exterior shape of the post 51 and further ordinarily includes a bottom surface 93 (FIGS. 5B and 7A). Ordinarily, both are generally circularly cylindrical in shape. The toolholder fluid flow passage 77 passes through the bottom surface 93 of the post hole 71. A seal 95 (FIGS. 1D, 4A, and 7A) such as an O-ring, is ordinarily disposed between an end 97 of the post 51 and the bottom surface 93 of the post hole 71 to assist in preventing leakage of fluid from around the post.

Figure 4A:
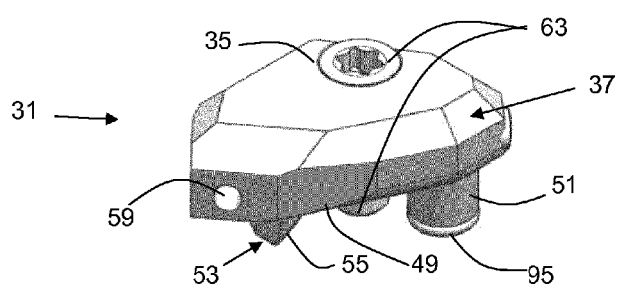
FIG. 4A is a perspective view.
Figure 4C:
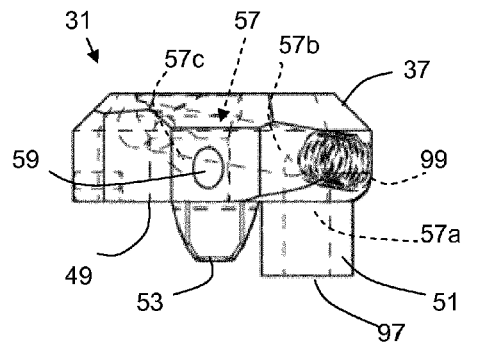
FIG. 4C is a front side view.
Figure 4E:
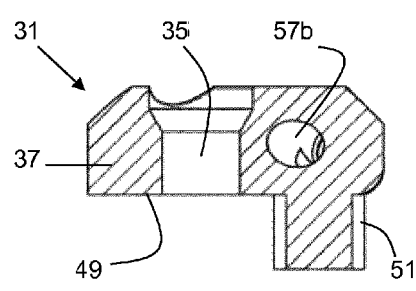
FIG. 4E is a cross-sectional view taken at section 4E-4E of FIG. 4A of a clamp according to an aspect of the present invention.
Figure 4B:
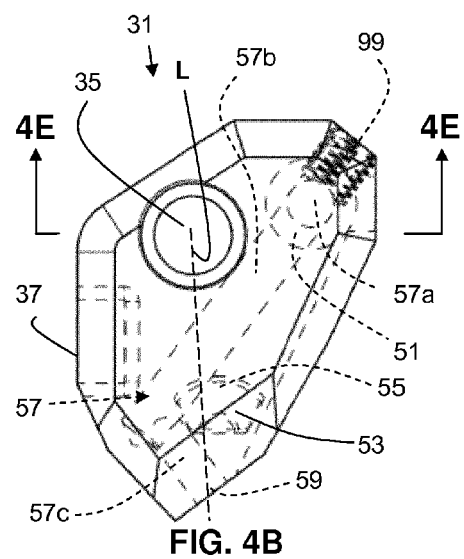
FIG. 4B is a top view.
Figure 4D:
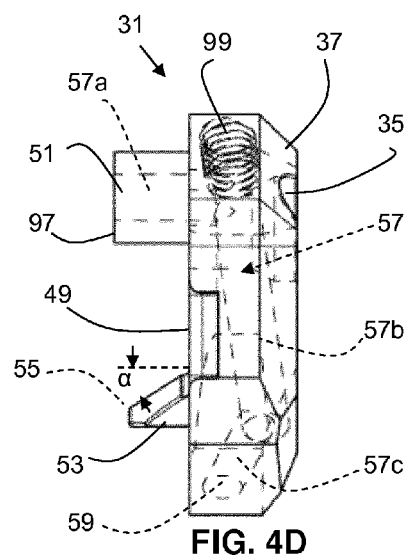
FIG. 4D is a left side view.

As seen in FIGS. 4B-4D, a portion 57a of the clamp fluid flow passage 57 extends from the end 97 of the post 51 into the clamp body 37. From there, the clamp fluid flow passage 57 extends to the opening 59 at the point above the bottom surface 49 of the clamp 31. If desired, plural openings 59 (not shown) can be provided in the clamp 31. The clamp fluid flow passage 57 in the clamp body 37 can be formed by drilling one or more holes from the opening 59 or other points so that the opening is in flow communication with the portion 57a of the clamp fluid flow passage that extends through the post 51. As seen in, e.g., FIG. 4B, to the extent that it is necessary to form several passage portions 57b and 57c to connect the opening 59 to the portion of the clamp fluid flow passage extending through the post 51, ends of such passage portions 57b other than the opening can be plugged by any suitable means, such as by providing a set screw that can mate with threads at the end of passage portions.

As implied in FIG. 7B the only part of the clamp 31 in contact with the cutting insert 25 may be the protrusion 53, thereby forming a gap between the clamp 31 and the upper side of the cutting insert. Such a gap may prevent premature stopping of clamp motion during assembling.

The toolholder body 29 can comprise a main body portion and a shim 101 attached to the main body portion and defining the bottom surface 65 of the pocket. The shim 101 can be secured to the main body portion by any suitable means, such as by a bolt or screw 103 through a hole 105 in the shim that mates with a threaded hole in the main portion of the toolholder body.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A tool comprising:
a cutting insert; and
a toolholder, the toolholder comprising:
a clamp for clamping the cutting insert in an insert-receiving pocket of a toolholder body, the clamp including a clamp body having a clamp bottom surface, a post extending downwardly from the clamp bottom surface;
the toolholder body including a post hole for receiving the post, and a toolholder hole separate from the post hole, wherein the pocket has a bottom surface at least partially defined by a rear wall and a forward edge;
a fastener extending through a clamp hole in the clamp body and into the toolholder hole;
a clamp fluid flow passage extending through the post and the clamp body to a point above the clamp bottom surface; and
a protrusion including a clamp clamping surface that extends downwardly from the clamp bottom surface, the clamp clamping surface forming an angle of less than or equal to 70 degrees and greater than or equal to 20 degrees with a longitudinal axis of the post, wherein the clamp bottom surface contacts a top surface of the cutting insert, and wherein when the fastener extends through the clamp hole into the toolholder hole and the post is disposed in the post hole, at least a majority of the clamp clamping surface is disposed closer to the rear wall than to the forward edge.

2. The toolholder tool as set forth in claim 1, wherein the post is substantially perpendicular to the clamp bottom surface.

3. The toolholder tool as set forth in claim 1, wherein the post is integral with the clamp body.

4. The toolholder tool as set forth in claim 1, wherein the clamp hole is remote from the post and the clamp fluid flow passage, the toolholder further comprising a toolholder fluid flow passage having a toolholder body fluid flow passage that extends through the toolholder body and is in flow communication with the clamp fluid flow passage.

5. The toolholder tool as set forth claim 1, wherein the post hole includes an interior shape substantially the same size as an exterior shape of the post and a bottom surface, the fluid flow passage passing through the bottom surface of the post hole.

6. The toolholder tool as set forth in claim 5, wherein a seal is disposed between an end of the post and the bottom surface of the post hole.

7. The toolholder tool as set forth in claim 1, wherein the fastener is a bolt, and the toolholder hole is a threaded hole with interior threads that mate with exterior threads on the fastener.

8. The toolholder tool as set forth in claim 1, wherein the toolholder body includes an axially extending shank portion and an end portion at an end of the shank portion, the pocket being disposed in the end portion.

9. The toolholder tool as set forth in claim 8, wherein the post hole extends generally radially relative to a longitudinal axis of the shank portion.

10. The toolholder tool as set forth in claim 1, wherein the toolholder body includes a shank portion and an end portion at an end of the shank portion, the pocket being disposed in the end portion, the shank portion including a generally axially extending first passage portion forming part of the toolholder body fluid flow passage and the end portion including a generally radially extending second passage portion in flow communication with the first passage portion and the post hole.

11. The toolholder tool as set forth in claim 10, wherein the toolholder body includes a third passage portion between the first passage portion and the second passage portion, the third passage portion extending at a non-zero angle relative to the first passage portion and the second passage portion.

12. A toolholder tool comprising:
a clamp arranged to clamp a cutting insert in an insert-receiving pocket of a toolholder body, the clamp including a clamp body having a clamp bottom surface and a post extending downwardly from the clamp bottom surface;
the toolholder body including a post hole for receiving the post, and a toolholder hole separate from the post hole, wherein the pocket has a bottom surface at least partially defined by a rear wall and a forward edge;
a fastener extending through a clamp hole in the clamp body and into the toolholder hole;
a clamp fluid flow passage extending through the post and the clamp body to a point above the clamp bottom surface;
a protrusion including a clamp clamping surface that extends downwardly from the clamp bottom surface, the clamp clamping surface forming an angle of less than or equal to 70 degrees and greater than or equal to 20 degrees with a longitudinal axis of the post, the clamp bottom surface contacting a top surface of the cutting insert, wherein when the fastener extends through the clamp hole into the toolholder hole and the post is disposed in the post hole, at least a majority of the clamp clamping surface is disposed closer to the rear wall than to the forward edge;
a shank portion located in the toolholder body;
an end portion disposed at an end of the shank portion, receiving pocket being disposed in the end portion, wherein the shank portion includes a generally axially extending first passage portion forming part of the toolholder body fluid flow passage and the end portion including a generally radially extending second passage portion in flow communication with the first passage portion and the post hole; and
a third passage portion located in the toolholder body between the first passage portion and the second passage portion, the third passage portion extending at a non-zero angle relative to the first passage portion and the second passage portion, wherein the third passage portion extends to an end of the end portion opposite the shank portion.

13. The toolholder tool as set forth in claim 1, wherein the toolholder body includes a main body portion and a shim attached to the main body portion and defining the bottom surface of the pocket.

14. A tool comprising:
a toolholder including a clamp for clamping a cutting insert in an insert-receiving pocket of a toolholder body, the clamp including a clamp body having a clamp bottom surface, a post extending downwardly from the clamp bottom surface, the toolholder body including a post hole for receiving the post, and a toolholder hole separate from the post hole, wherein the pocket has a bottom surface at least partially defined by a rear wall and a forward edge, a fastener extending through a clamp hole in the clamp body and into the toolholder hole, a clamp fluid flow passage through the post and the clamp body to a point above the clamp bottom surface, and a protrusion including a clamp clamping surface that extends downwardly from the clamp bottom surface, the clamp clamping surface forming an angle of less than or equal to 70 degrees and greater than or equal to 20 degrees with a longitudinal axis of the post; and a cutting insert disposed in the pocket, the cutting insert having a hole having a cutting insert clamping surface that is contacted by the clamp clamping surface, wherein the clamp clamping surface and the cutting insert clamping surface are formed such that, as the clamp bottom surface is moved toward a bottom surface of the pocket when the post is in the post hole and the fastener is in the clamp hole and the toolholder hole, the cutting insert is urged against the bottom surface and the rear wall, and the clamp bottom surface contacts a top surface of the cutting insert, and wherein at least a majority of the clamp clamping surface is disposed closer to the rear wall than to the forward edge.

15. The tool as set forth in claim 14, wherein all parts of the clamp are arranged to move uniformly in the same direction during clamping of the cutting insert.

* * * * *